(12) United States Patent
Williams et al.

(10) Patent No.: US 10,928,192 B2
(45) Date of Patent: Feb. 23, 2021

(54) INTERFEROMETRIC POSITION SENSOR

(71) Applicant: MBDA UK LIMITED, Stevenage (GB)

(72) Inventors: Ross Matthew Williams, Filton (GB); Christopher Ralph Carter, Stevenage (GB)

(73) Assignee: MBDA UK LIMITED, Stevenage (GB)

(*) Notice: Subject to any disclaimer, the term of this patent is extended or adjusted under 35 U.S.C. 154(b) by 0 days.

(21) Appl. No.: 16/346,581

(22) PCT Filed: Nov. 2, 2017

(86) PCT No.: PCT/GB2017/053308
§ 371 (c)(1),
(2) Date: May 1, 2019

(87) PCT Pub. No.: WO2018/083482
PCT Pub. Date: May 11, 2018

(65) Prior Publication Data
US 2019/0257645 A1 Aug. 22, 2019

(30) Foreign Application Priority Data
Nov. 3, 2016 (GB) .................................. 1618796.5

(51) Int. Cl.
 G01B 9/02 (2006.01)
 G01B 11/26 (2006.01)
 G01D 5/26 (2006.01)

(52) U.S. Cl.
 CPC .......... *G01B 11/26* (2013.01); *G01B 9/02019* (2013.01); *G01B 9/02081* (2013.01);
(Continued)

(58) Field of Classification Search
 CPC .. G01B 9/02; G01B 9/02015; G01B 9/02016; G01B 9/02019; G01B 2290/45
See application file for complete search history.

(56) References Cited

U.S. PATENT DOCUMENTS 3,409,375 A 11/1968 Hubbard
3,443,871 A 5/1969 Chitayat
(Continued)

FOREIGN PATENT DOCUMENTS

CN 103697807 A 4/2014
DE 3419024 A1 9/1985
(Continued)

OTHER PUBLICATIONS

International Search Report dated Jan. 23, 2018 issued in PCT/GB2017/053308.
(Continued)

*Primary Examiner* — Jonathan M Hansen
(74) *Attorney, Agent, or Firm* — Scully, Scott, Murphy & Presser, PC

(57) ABSTRACT

An interferometric position sensor for sensing the position of an object is disclosed. The position sensor comprises a light source arranged to emit light, a beam splitter, and a detector array. The beam splitter is arranged to split the light between first and second optical paths, which are configured such that the split light is recombined so as to form an optical interference pattern dependent on the difference between the optical path lengths of the first and second optical paths. The detector array is arranged to measure the intensity of at least a part of the optical interference pattern. At least one of the first and second optical path lengths is arranged to be dependent on the position of the object, such that changes in the optical interference pattern can be related to changes in the position of the object.

15 Claims, 3 Drawing Sheets

(52) U.S. Cl.
CPC ......... *G01D 5/266* (2013.01); *G01B 2290/15* (2013.01); *G01B 2290/45* (2013.01)

(56) References Cited

U.S. PATENT DOCUMENTS

| | | | |
|---|---|---|---|
| 3,756,722 | A | 9/1973 | Wetzel |
| 4,859,066 | A | 8/1989 | Sommargren |
| 5,018,862 | A * | 5/1991 | Aiello ................. G01B 9/02081 356/450 |
| 6,373,578 | B1 * | 4/2002 | Nishikawa ......... G01M 11/0228 356/515 |
| 8,174,705 | B1 | 5/2012 | Coward et al. |
| 2001/0006420 | A1 * | 7/2001 | Kato .................... G01B 11/306 356/498 |
| 2006/0017933 | A1 | 1/2006 | Schluchter et al. |

FOREIGN PATENT DOCUMENTS

| | | |
|---|---|---|
| EP | 2584305 A1 | 4/2013 |
| GB | 970640 A | 9/1964 |
| GB | 2170005 A | 7/1986 |
| GB | 2184866 A | 7/1987 |
| GB | 2296766 A | 7/1996 |
| WO | WO 89/02059 A1 | 3/1989 |
| WO | WO 02/34321 A1 | 5/2002 |

OTHER PUBLICATIONS

GB Search Report dated Mar. 3, 2017 issued in GB 16187965.
Renishaw Plc: "XL-80 laser measurement system", Apr. 1, 2016 (Apr. 1, 2016), Retrieved from the Internet: URL:https://www.google.com/url?sa=t&rct=j&q=&esrc=s&source=web&cd=2&cad=rja&uact=8&ved=0ahUKEwjP-de4wtLYAhWOU1AKHXLuDqEQFggtMAE&url=http%3A%2F%2Fresources.renishaw.com%2Fen%2Fdownload%2Fbrochure-xl-80-laser-measurement-system--81921&usg=A0vVaw3oK0cN606iyjJw2l_cetJo [retrieved on Jan. 12, 2018].
International Preliminary Report on Patentability dated May 7, 2019, together with the Written Opinion received in related International Application No. PCT/GB2017/053308.

* cited by examiner

INTERFEROMETRIC POSITION SENSOR

FIELD OF THE INVENTION

This invention relates to an interferometric position sensor, and in particular, but not exclusively, to a position sensor operable to sense the position of an object through measurements of an optical interference pattern.

BACKGROUND

Interferometric position sensors are able to provide a high standard of precision and resolution. Typically such sensors function by separating two coherent beams of light and propagating them along two separate paths, one of which functions as a reference path and one of which functions as a measurement path. Differences in path length between reference and measurement paths results in an interference pattern when light propagating in the two paths is recombined, consisting for example of light and dark fringes where constructive and destructive interference takes place. Such sensors are therefore sensitive to movements at a scale similar to that of the wavelength of the light used. An example of such an interferometer is the well-known Michelson-Morley interferometer, which can be adapted for use as a position sensor.

In order to make use of this high level of sensitivity, it is of course necessary to ensure that the optical components defining the reference and measurement paths are highly stable. This is because any change in the path length of the reference path will be interpreted as a change in the position of the object, and, likewise, any change in the position of the components defining the measurement path will be interpreted as a change in the position of the object.

SUMMARY OF THE INVENTION

In accordance with a first aspect of the invention, there is provided an interferometric position sensor for sensing the position of an object, the position sensor comprising: a light source arranged to emit light; an optical element having a partially-reflective surface arranged to split the light between first and second optical paths, which first and second paths are configured such that the split light is recombined so as to form an optical interference pattern dependent on the difference between the optical path lengths of the first and second optical paths; and a detector array arranged to measure the intensity of at least a part of the optical interference pattern; wherein the optical element further comprises a reflective surface from which light propagating in the second optical path is reflected; and wherein at least one of the first and second optical path lengths is dependent on the position of the object such that changes in the optical interference pattern can be related to changes in the position of the object.

Such a position sensor is able to provide enhanced precision to a number of applications. In addition the sensor has enhanced stability, since two reflective components (the partially-reflective, beam-splitting surface and the reflective surface) in the reference path are formed from one optical element. As a result any movement or vibration to which the sensor is subjected will not affect the relative distance between these two reflective surfaces. Errors arising from changes in the distance between these two optical elements are therefore reduced. The position sensor is therefore better suited to operation in dynamic environments in which relative movement of the reflective surfaces may otherwise be possible.

The optical interference pattern may comprise a set of fringes which move in dependence on the movement of the object. Measurement of the movement of the optical interference pattern can then be used to infer the change in position of the object as well as other characteristics of the motion of the object. For example, the sensor may be further configured to determine the velocity and acceleration of the platform. It will be understood that the sensor can be used either sensing linear motion or for sensing angular motion or tilt of an object, as is described in further detail below. In the latter case it will be appreciated that the position, velocity and acceleration sensed will be the orientation, angular velocity and angular acceleration of the object.

The detector array may comprise first and second photodetectors spaced apart at a distance of around an integer number of fringe widths of the optical interference pattern plus or minus a half fringe width. In one exemplary embodiment, the detector array may comprise first and second photodetectors spaced apart at a distance not greater than the width of one fringe of the optical interference pattern on the detector array.

Using two photodetectors in the detector array, preferably spaced apart at a selected distance, enables the number of fringes passing a particular point and the direction in which they are moving to be inferred, as will be explained in further detail below. In some embodiments, the detector array may further comprise magnifying optics arranged to magnify the optical interference pattern at the detector array. The use of magnifying optics allows larger photodetectors to be used, since the fringe pattern being measured is larger.

The position sensor may be triggerable at an initial position of the object, and subsequently provide corrections to the initial position. The corrections to the initial position may be determined by a digital counter in communication with one of the photodetectors so as to count the number of fringes passing said one of the photodetectors. A digital counter provides a convenient method by which the movement of the fringes can be counted.

The direction of movement of the set of fringes may be determined by the initial state of the first and second photodetectors, and by which photodetector first records a change in its state.

The object may be tiltable about an axis, and the position sensor may be configured such that the difference between optical path lengths of the first and second optical paths can be used to infer the tilt of the object about the axis.

The first optical path may include a retroreflector mounted on the object. Use of a retroreflector is particularly preferred in embodiments where the position sensor is used to measure tilt since, as an object tilts, the angle of incidence of the first light path on the object changes. A simple reflective surface would not reflect the light back along the same light path, and as a result the optical interference pattern may not be formed across a wide range of tilt of the object.

In one embodiment described further below, the reflective surface may reflect light propagating from the partially reflective surface back to the partially reflecting surface so as to recombine with light propagating in the first optical path. In this arrangement the second light path is entirely contained within the optical element, as a result of which the arrangement is particularly stable to external movement.

In an alternative embodiment described in further detail below, the second optical path may include a further retroreflector mounted on the object. This arrangement maintains some additional stability in the second optical path but increases the amount by which the optical path difference between the first and second light paths changes when the object tilts. In this embodiment, the retroreflector and the further retroreflector may be mounted on the object substantially symmetrically about the axis. Adding weight to a particular part of the object can affect its balancing about the axis. A symmetric arrangement can have a reduced effect on any necessary re-balancing of the object.

The detector array may be rotatable. The ability to rotate the detector array, for example by a few degrees, enables the detector array to be configured so as to receive a more appropriate projection of the optical interference pattern.

The invention extends to a system comprising at least two interferometric position sensors as described above; the at least two interferometric position sensors being arranged to sense changes in the position of the object in mutually orthogonal directions.

BRIEF DESCRIPTION OF THE DRAWINGS

There follows, by way of example only, a detailed description of specific embodiments of the invention with reference to the accompanying drawings in which.

DETAILED DESCRIPTION

Figure 1:
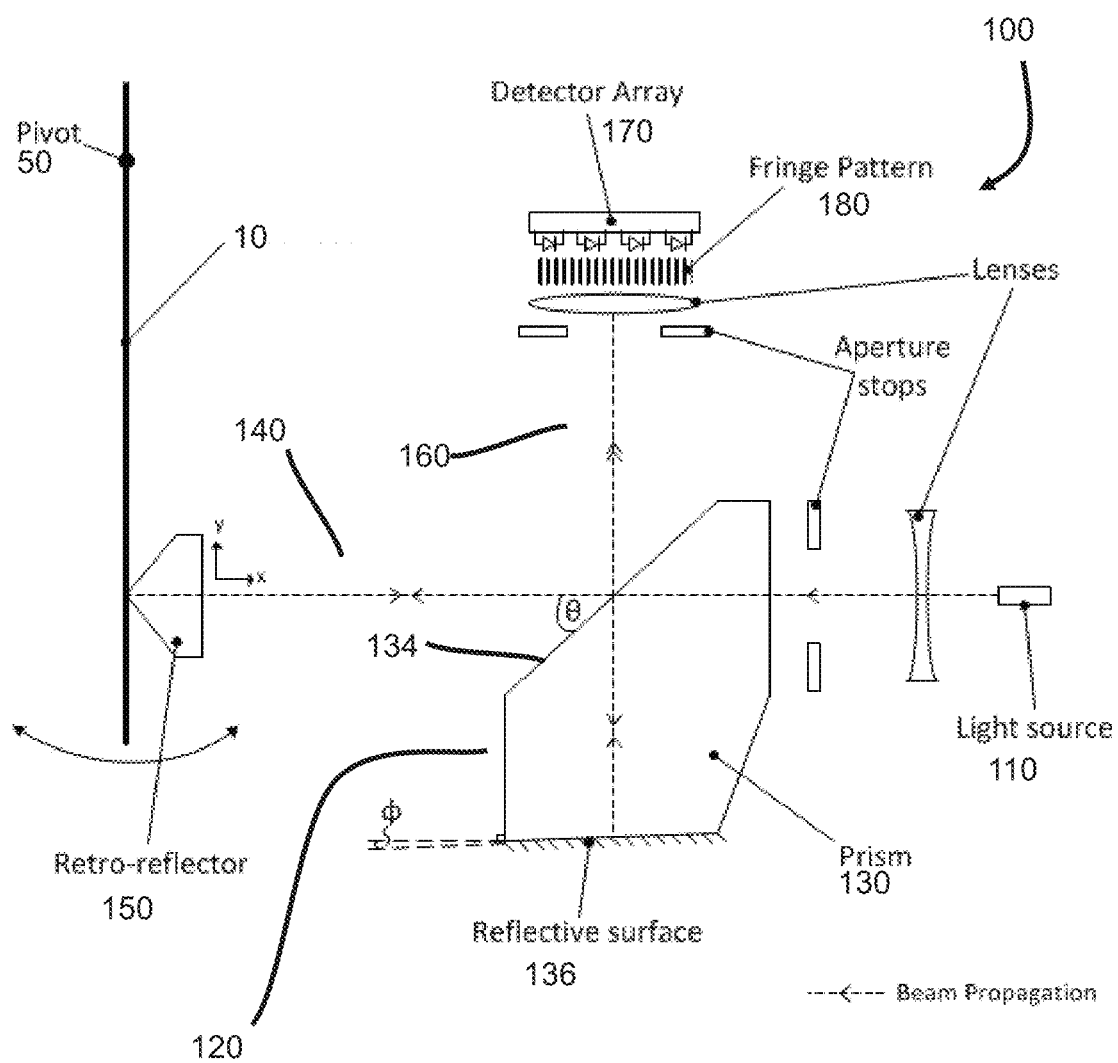
FIG. 1 is schematic illustration of a position sensor in accordance with a first embodiment of the invention.

An interferometric position sensor 100 in accordance with a first embodiment of the invention is schematically illustrated in FIG. 1. Position sensor 100 is used for detecting the degree to which platform 10 is tilted about an axis running perpendicular to the plane of the diagram through pivot 50. Platform 10 may, for example, be a component part of an actuation mechanism used in precision additive layer manufacturing, and the position sensor 100 used to measure the degree to which the platform 10 has rotated. In such an example the position sensor 100 may assist in enabling the manufacture of parts with tolerances of the order of microns. The position sensor comprises a coherent light source 110, such as a laser diode; reference and measurement limbs 120 and 140 respectively; and a detector limb 160. The beam emitted by the light source 110 is broadened so as to provide a wavefront large enough to enable a suitable interference pattern to be created. Aperture stops are provided in order to minimise the propagation of stray light within the sensor.

Light emitted from the source 110 is incident on an optical element 130. One surface 134 of the element 130, hereinafter referred to as the beam-splitting surface, is partially reflective and inclined at 45° to the light so as to split the light into two component parts, one propagating along the reference limb 120, and one along the measurement limb 140. Optical element 130 is made from a standard material such as glass or fused silica, with standard optical coatings used to determine the partial reflectivity of the beam splitting surface 134. Further optical components (not shown) may be used to correct for any refraction effects at the beam-splitting surface 134. For example, a glass wedge of appropriate geometry can be used or the element 130 can be embedded (or partially embedded) in a larger structure such that the beams propagate across interfaces between media of different refractive indices normally. Alternatively it may be possible to select the geometry of the optical element 130 to tailor the beam paths appropriately.

Element 130 is extended in the reference direction, terminating in a reflective surface 136 that reflects the light back towards the beam-splitting surface to propagate along the detector limb. The path of the light within the reference limb is therefore entirely contained within the optical element 130. This ensures consistent alignment of the components in the reference limb and a consistent path length for light propagating in the reference limb. In particular it is ensured that the reflective surface 136 remains at a constant separation from the beam splitting surface 134, regardless of vibrations or other motion to which the interferometric positions sensor is subjected. The reflective surface 136 is angled such that the light is incident on it at an angle slightly off perpendicular.

The measurement limb of the interferometer terminates at a retroreflector 150 mounted on the platform 10, shown as flat in FIG. 1 for simplicity. The retroreflector, in the present embodiment, is a corner-cube retroreflector which directs incident light back in the same direction from which it came. Thus light propagating along the measurement limb path is also reflected back towards the beam splitting surface 134 of the optical element 130. A retroreflector is used instead of a simple planar reflector because the tilting motion of the platform about pivot 50 results in the angle of the measurement limb relative to the interferometer changing as well as its length. A simple planar reflector would therefore not reflect light back to the beam-splitting surface 134 for all positions of the platform 10.

At the beam splitting surface 134, light from the measurement limb of the interferometer is also partially reflected towards the detector limb. Light from both the reference and measurement limbs therefore propagates along the detector limb towards a detector 170. Light from the reference limb interferes with that from the measurement limb to create a fringe pattern, indicated schematically at 180, in the detector limb. The pattern is magnified by suitable lenses and projected onto the detector 170. As is well understood, because the reflective surface 136 of the reference limb 120 is slightly off-perpendicular, the observed pattern will be of straight line fringes, with bright and dark fringes occurring at points dependent on the difference in optical path length between the reference and measurement limbs. As the length of the measurement limb 140 changes, therefore, the observed fringe pattern 180 will change. The length of the measurement limb 140 will of course change as the primary reflector, to which the retroreflector terminating the measurement limb is mounted, tilts about the axis. As the retroreflector moves, the observed fringes 180 will also appear to move, with the intensity recorded at any one point on the detector surface changing accordingly. Counting the number of fringes moving past a particular point on the detector can therefore be used to provide a measure of the amount by which the platform 10 has moved about the axis running through pivot 50.

Figure 2:
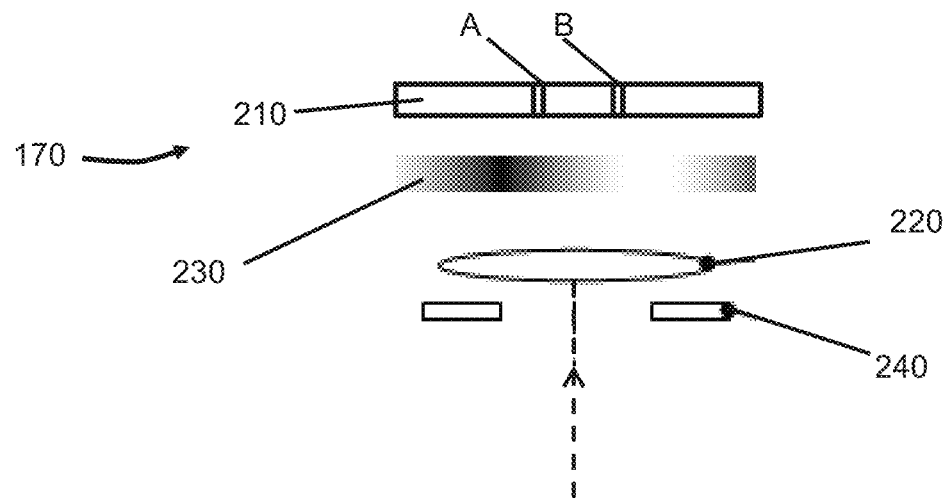
FIG. 2 is a schematic illustration of a component part of the position sensor illustrated in FIG. 1.

The detector 170 is illustrated in further detail in FIG. 2 and comprises a number of light sensors. In the present embodiment two photodiodes A and B, mounted on a platform 210, are provided to act as the detector. A detector optical element 220 is used to magnify the fringe pattern, firstly so that the photodiodes can be accommodated given the necessary separation, and secondly so that each photodiode is illuminated by one fringe at a time. (It will be appreciated that more than one optical element may be used to effect suitable magnification, and that only one element 210 is illustrated in FIG. 2 for reasons of simplicity). The photodiodes are separated by a distance selected such that the phase difference between the light sensed by them is approximately one quarter wavelength. This arrangement can be seen in FIG. 2 where fringes of the optical interference pattern (referenced with numeral 230), as magnified by the detector optical element 220, are shown in relative position to the photodiodes A and B.

In the present embodiment the platform 210 on which the photodiodes A and B are mounted is rotatable, so that the orientation of the photodiodes relative to the detector limb can be changed in order to achieve an improved profile of the optical interference pattern on the photodiodes. Each of the two photodetectors is connected to an digital counter which, because each of the photodetectors is illuminated by only one fringe at a time, is able to count the number of fringes that pass through counting the number of times that the photodiode switches from an illuminated cony state to an unilluminated 'off' state.

Figure 3:
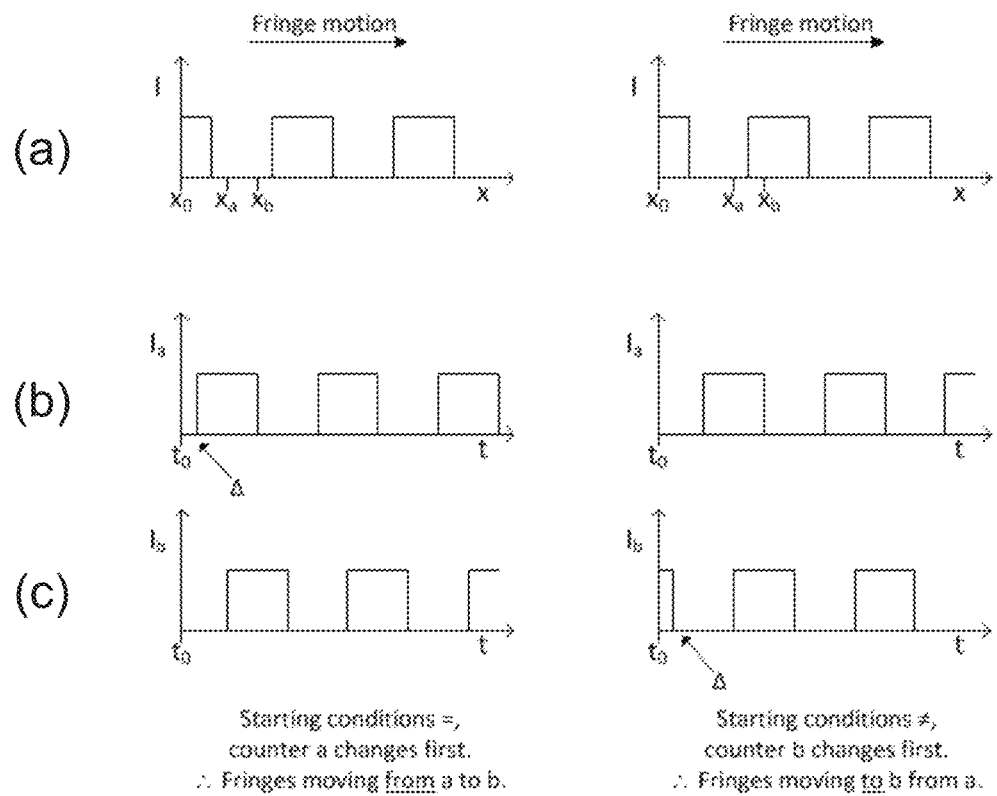
FIG. 3 is a schematic diagram illustrating optical intensity profiles detected in operation of the position sensor illustrated in FIG. 1.

By using two photodetectors separated as described above the direction of fringe movement can also be sensed, as will now be described with reference to FIGS. 3a to 3c. FIG. 3a schematically illustrates the optical intensity I of the fringe pattern varying with position x. The photodiodes are located at positions $x_A$ and $x_B$, with $x_A < x_B$. FIGS. 3b and 3c schematically illustrate the optical intensity $I_A$ and $I_B$ as it varies with time t in two different starting conditions. For the purposes of illustration it is assumed that there is a step change in light intensity between the maximum and minimum intensities across one fringe in the optical interference pattern. Referring firstly to FIG. 3a, it will be noted that there are two relevant possible starting conditions for the photodiodes A and B: either both will be in the same condition (both on or both off), as is illustrated in the left-hand diagram of FIG. 3a (both off, or unilluminated), or one will be on whilst the other is off, as is illustrated in the right-hand diagram of FIG. 3a (photodiode A off, and photodiode B on). FIGS. 3b and 3c schematically show how the intensities measured by the photodiodes A and B varies with time in the situation where the fringes are moving from left to right across the diagrams of FIG. 3a, in the positive x direction as illustrated.

Consider firstly the situation in which the photodiodes are in the same 'off' condition, as is illustrated in the left hand diagram of FIG. 3a. As the fringes move towards the positive x direction (see the left hand diagrams of FIGS. 3b and 3c), photodiode A transitions to the cony condition shortly before photodiode B. Under the second set of starting conditions, illustrated in the right hand diagram of FIG. 3a, and again as the fringes move towards the positive x direction (see the right hand diagrams of FIGS. 3b and 3c), photodiode B transitions to the 'off' state before photodiode A transitions to the 'on' state. It will be appreciated that, generally, where the photodiodes A and B start in the same condition (either both on or both off), then the direction of movement of fringes can be deduced to be from the photodiode that changes first towards the photodiode that changes second; and that, where the photodiodes A and B start in different conditions (one on and the other off), then the direction of movement of fringes can be deduced to be to the photodiode that changes first from the photodiode that changes second. The counter can then count the number of transitions between the cony and 'off' states of the photodiodes in order to count the number of fringes that move past the photodiodes, and hence deduce the angle through which the primary reflector has moved. Any changes in direction (for example, due to vibration of the primary reflector) can be accounted for in a similar way using appropriate processing to record instances of the two photodiodes not transitioning between states in the appropriate order. In the present embodiment the appropriate processing is performed by a suitably configured microprocessor chip in the digital counter.

The angular precision of the interferometric position sensor 100 to changes in the orientation of the platform 10 about its pivot 50 can be estimated taking the assumption that the detector can identify the change in intensity from peak to minimum as a single fringe moves past the detector point as the smallest change in position of the retroreflector mounted on the platform 10. The change from peak to minimum occurs for a half-wavelength change in the distance along the measurement limb of the interferometric position sensor 100 as compared to the reference limb, the relevant wavelength λ being that of the light emitted by light source 110. For an Nd:YAG laser operating at 1064 nm, therefore, this distance would be 532 nm. Taking the distance from the pivot point of the primary reflector to the retroreflector to be x, the angular precision θ can then be estimated from $\tan \theta \approx \lambda/2x$, which, taking x to be of order 50 mm, results in θ being approximately 0.01 mrad.

The change in orientation of the platform between successive fringes calculated above can also be used to determine the orientation, angular velocity and angular acceleration of the platform 10, which quantities can be used in determining appropriate control for the platform 10. In the present embodiment, the digital counter includes a clock mechanism such that the counter's microprocessor can be configured to calculate the orientation, angular velocity and angular acceleration from the timing of the passing of the fringes, and provide these quantities as an output to the user or to a subsequent processor responsible, for example, for controlling the motion of the platform 10 or for using these quantities in further calculations.

Figure 4:
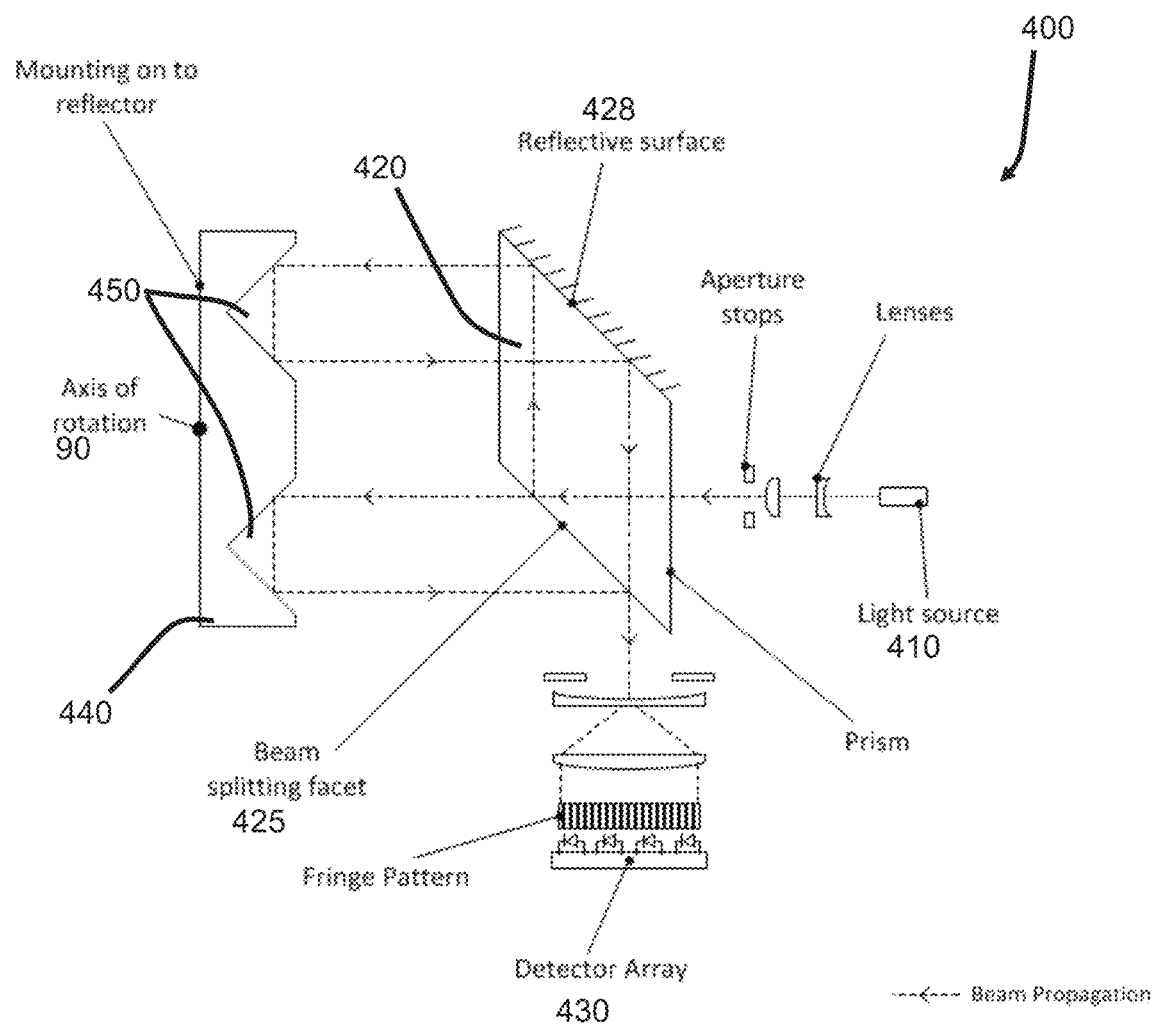
FIG. 4 is a schematic illustration a further position sensor in accordance with a second embodiment of the invention.

FIG. 4 is a schematic illustration of an alternative interferometric sensor 400 in accordance with a further embodiment of the invention. Sensor 400 provides a direct measurement of the tilt angle of a platform 440 as it is rotated about a pivot at a known point 90 about an axis perpendicular to the plane of the diagram, rather than a measurement of the linear displacement of a particular point on the platform from which a tilt angle must then be inferred. Interferometric sensor 400 includes a light source 410, the beam from which is split into two distinct paths by a partially reflecting surface 425 of a prism 420 before being recombined and brought to a focus so as to produce a pattern of interference fringes at a detector array 430. The paths terminate at one of two corner cube reflector elements 450 mounted on the platform 440. The two optical paths are each directed to a respective one of these elements 450 so as to be reflected back along their original path. In the present embodiment, the elements 450 are disposed symmetrically about the axis of rotation about which the tilt is to be measured. Thus the length of both paths varies when the primary reflector tilts: one increasing in length, and the other decreasing in length by a corresponding amount.

Light source 410 is, in the present embodiment, a laser, with appropriate beam broadening optics provided in order to generate an approximately planar wavefront large enough to ensure interference at the detector array 430. The broadened beam is normally incident on prism 420, through which it propagates to the partially reflective surface 425. At this surface the beam is split, a first part passing through the surface 425, and a second part being reflected through 90° through the prism towards a reflective surface 428 at the opposing end of the prism. This second part is reflected again through 90° at surface 428 so as to exit the prism in a direction parallel to the first part of the beam. Both first and second parts are incident on the corner cube retroreflectors mounted on the platform 440, so as to return to prism 420. Both first and second parts are reflected through 90° again by, respectively, the partially reflecting surface 425, and the reflective surface 428. In this way portions of the two parts are recombined and directed towards the detector array 430, having been brought to a focus by suitable optical components so as to generate a fringe pattern.

In order to create an interference pattern of straight line fringes, the reflective surface 428 is slightly angled, about an axis defined by the intersection of the surface and the plane of the diagram. As shown in the FIG. 4, in the plane looking into the page, surface 428 is parallel to the partially reflective surface 425. Thus, as with interferometric sensor 100, the fringe pattern generated by interferometric sensor 400 will consist of a pattern of straight line fringes which will move as the platform 440 tilts, and the path length to each of the corner cube retroreflectors mounted on the platform changes. The number of fringes that pass any one particular point on the detector array can be directly related to the angle through which the platform 440 has moved. It will be noted that interferometric sensor 400 also removes alignment problems for the reflective surfaces 425 and 428 by making use of an extended prism component which ensures that the separation between the reflective surfaces remains constant despite external dynamic effects. In addition, platform 440 in interferometric sensor 400 is arranged so that its mass distribution is also symmetric about this axis.

The interferometric position sensors 100, 400 according to first and second embodiments of the invention are operable to sense movement in one direction. Where it is useful to sense movement of an object in more than one direction, or tilt of an object about more than one axis, a number of position sensors are used, arranged so as to sense changes in position in different directions. The different direction can be selected to be mutually orthogonal. For example, if a platform, such as platform 10, is mounted on a gimbal structure so as to be able to tilt about two axes, two position sensors 100 can be used, each one being operable to sense the degree of tilt about each axis. Similarly, more than one position sensor can be used in order to sense translational movement of an object in more than one direction.

Whilst specific embodiments of the invention have been described in the above, it is to be noted that variations and modifications to those embodiments are possible without departing from the scope of the present invention which is defined in the accompanying claims. For example, whilst it has been described above to dispose the corner cube reflector elements of interferometric sensor 400 symmetrically about a rotation axis, it will of course be possible for the sensor to function adequately where there is a deviation from symmetry about the rotation axis, it being possible to appropriately calibrate the sensor so as to account for the offset from the symmetrical position. Such an offset may for example be deliberately designed into the sensor so as to provide a greater degree of flexibility for the placement of the position sensor in a system subject to space constraints.

Moreover, whilst it has been described above to use a digital counter incorporating a dedicated microprocessor to determine orientation, angular velocity, and angular acceleration, it will be appreciated that in other embodiments it will be possible to use a general purpose computer receiving an output directly from the photodiodes and executing suitable software to determine these quantities.

It will also be noted that, whilst the spacing of the photodetectors in the above has been described to be approximately half the width of one of the fringes of the optical interference pattern, alternative separations of the photodetectors are possible. It will be immediately appreciated that the determination of direction of fringe movement as described above can be performed in the same way if the photodetectors are at any separation less than one fringe width, although it is expected to work best when the separation is around one half fringe width. It may however be physically difficult to position the photodetectors this close to one another, depending on for example the strength of the magnifying optics that can be used. It may in certain cases therefore be preferable for the photodetectors to be positioned further apart, and those skilled in the art will appreciate that the method described above for determining the direction of fringe movement will work similarly when the separation between the photodetectors is an integer number of fringe widths plus or minus a half fringe width.

Finally, it should be clearly understood that any feature described above in relation to any one embodiment may be used alone, or in combination with other features described, and may also be used in combination with one or more features of any other of the embodiments, or any combination of any other of the embodiments.

The invention claimed is:

1. An interferometric position sensor for sensing the position of an object, the position sensor comprising:
  a) a light source arranged to emit light;
  b) an optical element having a partially-reflective surface arranged to split the light between first and second optical paths, which first and second paths are configured such that the split light is recombined so as to form an optical interference fringe pattern dependent on the difference between the optical path lengths of the first and second optical paths;
  c) a detector array arranged to measure the intensity of at least a part of the optical interference pattern, the detector array comprising first and second photodetectors spaced apart at a distance approximately equal to an integer number of fringe widths of the optical interference fringe pattern plus or minus a half fringe width; and
  d) a digital counter in communication with each of the first and second photodetectors, wherein, the optical element is configured to magnify the fringe pattern such that each photodetector is illuminated by one fringe at a time such that the digital counter is able to count the number of fringes passing each photodetector;
  wherein the optical element further comprises a reflective surface from which light propagating in the second optical path is reflected;
  wherein at least one of the first and second optical path lengths is dependent on the position of the object such that changes in the optical interference pattern can be related to changes in the position of the object; and
  wherein the counter is configured to determine the velocity and acceleration of the object from the timing of the passing of the fringes.

2. A sensor as claimed in any claim 1 wherein the optical interference pattern comprises a set of fringes which move in dependence on the movement of the object.

3. A sensor as claimed in claim 1 wherein the detector array comprises first and second photodetectors spaced apart at a distance not greater than the width of one fringe of the optical interference pattern on the detector array.

4. A sensor as claimed in claim 1 further comprising magnifying optics arranged to magnify the optical interference pattern at the detector array.

5. A sensor as claimed in claim 1 wherein the position sensor is triggerable at an initial position of the object, and subsequently provide corrections to the initial position.

6. A sensor as claimed in claim 5, wherein the corrections to the initial position are determined by the digital counter in communication with one of the photodetectors so as to count the number of fringes passing said one of the photodetectors.

7. A sensor as claimed in claim 1 wherein the direction of movement of the set of fringes is determined by the initial state of the first and second photodetectors, and by which photodetector first records a change in its state.

8. A sensor as claimed in claim 1 wherein the object is tiltable about an axis, and wherein the position sensor is configured such that the difference between optical path lengths of the first and second optical paths can be used to infer the tilt of the object about the axis.

9. A sensor as claimed in claim 1, wherein the first optical path includes a retroreflector mounted on the object.

10. A sensor as claimed in claim 1 wherein the reflective surface reflects light propagating from the partially reflective surface back to the partially reflecting surface so as to recombine with light propagating in the first optical path.

11. A sensor as claimed in claim 1 wherein the second optical path includes a further retroreflector mounted on the object.

12. A sensor as claimed in claim 11 wherein the retroreflector and the further retroreflector are mounted on the object substantially symmetrically about the axis.

13. A sensor as claimed in claim 1 wherein the detector array is rotatable.

14. A system comprising at least two interferometric position sensors as claimed in claim 1, the at least two interferometric position sensors being arranged to sense changes in the position of the object in mutually orthogonal directions.

15. A sensor as claimed in claim 1, wherein the digital counter is configured to determine the orientation, angular velocity and angular acceleration of the object.

* * * * *